(12) United States Patent
Virtanen (10) Patent No.: US 7,170,066 B2
(45) Date of Patent: Jan. 30, 2007

(54) METHOD AND APPARATUS FOR DETERMINING THE INTENSITY DISTRIBUTION OF A RADIATION FIELD

(75) Inventor: Ari Virtanen, Jyväskylä (FI)

(73) Assignee: Gammapro Oy, Jyvaskyla (FI)

( * ) Notice: Subject to any disclaimer, the term of this patent is extended or adjusted under 35 U.S.C. 154(b) by 263 days.

(21) Appl. No.: 10/495,991

(22) PCT Filed: Dec. 18, 2002

(86) PCT No.: PCT/FI02/01039

§ 371 (c)(1),
(2), (4) Date: May 18, 2004

(87) PCT Pub. No.: WO03/054582

PCT Pub. Date: Jul. 3, 2003

(65) Prior Publication Data

US 2005/0006591 A1    Jan. 13, 2005

(30) Foreign Application Priority Data

Dec. 20, 2001    (FI)    .................................. 20015052

(51) Int. Cl.
*G01T 1/18* (2006.01)
(52) U.S. Cl. .................................................. 250/374
(58) Field of Classification Search ................. 250/374
See application file for complete search history.

(56) References Cited

U.S. PATENT DOCUMENTS

| | | | | |
|---|---|---|---|---|
| 3,760,183 A | * | 9/1973 | Neissel | .................. 250/370.04 |
| 4,320,299 A | | 3/1982 | Bateman et al. | |
| 4,816,683 A | | 3/1989 | Marsden | |
| 4,937,455 A | * | 6/1990 | Kurz | ........................ 250/385.1 |
| 4,999,501 A | * | 3/1991 | Lacy | ........................ 250/385.1 |
| 5,583,908 A | | 12/1996 | Antich et al. | |

FOREIGN PATENT DOCUMENTS

| | | |
|---|---|---|
| DE | 19711927 | 9/1998 |
| EP | 0556901 | 8/1993 |

* cited by examiner

*Primary Examiner*—David Porta
*Assistant Examiner*—Christine Sung
(74) *Attorney, Agent, or Firm*—Fildes & Outland, P.C.

(57) ABSTRACT

The invention relates to a method and apparatus for determining the intensity distribution of a radiation field. In the method, the ionization caused by the radiation field is detected by parallel ionization detector planes arranged in an ionization chamber, two of which planes are formed of series of wires determining the position of an ionization event in the X and Y directions, which detector planes provide the X and Y co-ordinates $X_1$, $Y_1$ of the ionization event. The ionization event is created by photonuclear reaction products arising from the radiation.

18 Claims, 5 Drawing Sheets

METHOD AND APPARATUS FOR DETERMINING THE INTENSITY DISTRIBUTION OF A RADIATION FIELD

TECHNICAL FIELD

The present invention relates to a method and apparatus for determining the intensity distribution of a radiation field, which apparatus includes at least two parallel ionization detector planes arranged in an ionization chamber, which are arranged to be formed of a series of wires determining the location of an ionization event in an X and an Y direction, and in which the detector planes are connected to measurement electronics, in such a way that the said two detector planes are arranged to provide the X and Y co-ordinates of the ionization event.

BACKGROUND OF THE INVENTION

The regular and sufficiently accurate and careful performance of measurement and other quality-control measures for patient-care equipment, is the foundation of reliable radiotherapy. Together with changes in the conditions and demands of this work, the development of external radiotherapy methods, accelerators, and equipment relating to the radiotherapy chain has brought new challenges for those working with radiotherapy.

It is difficult for hospital physicists to carry out their duties within the constraints of working time and existing personnel resources. The complexity of the measuring devices and the preparations required by measurements mean that making quality control measurements of patient-care equipment using present equipment is also time consuming. Making measurements takes up the entire working time of hospital physicists, leaving them no time to carry out any other tasks. In addition, the measurements specified in a quality-control program for radiotherapy equipment cannot be made during normal working time, as the equipment is being used for therapy at that time.

Besides changing demands, increased pressure to develop measuring equipment that would accelerate and simplify the tasks of hospital physicists has also arisen from the development of data management and database systems.

One equipment solution according to the state of the art, presently used for quality-control measurements of patient-care equipment, is represented by the so-called water phantom. A water phantom comprises a water-filled plexiglass box, inside which ionization detectors measuring the intensity of the radiation field on an X-Y plane are moved. The ionization detectors, of which there are typically 1–24, are arranged in a comb shape.

The planar movement of the detectors can be limited to either the X or the Y direction. The plane measurement is repeated at different depths in the Z direction. Due to the small number of detectors, the position measurement is accurate to only the order of a few centimeters. Any increase in the number of detectors will significantly raise the price of the device and the amount of complex electronics required.

A measurement made using the detector in question may take up to several hours, during which time the ambient temperature, among other factors, can vary, simultaneously altering the gas pressure in the ionization chamber of the detectors. It is difficult to compensate later for the measurement error that this creates and which in any event reduces the reliability of the measurement.

In addition to the above, due to the measurement principle of sweeping the radiation field of the detectors, the water phantom according to the state of the art cannot measure the intensity distribution of a field independently of time. Practically all new accelerators are time-dependent, so-called dynamic-field accelerators, making it extremely desirable to also be able to determine the intensity distribution of the field.

A second device representing the state of the art is a plane detector comprising typically less than 10 ionization chambers, which is used in high-speed quality assurance measurements to check the stability, evenness, and symmetry of a radiation field. The position resolution ability of these devices is poor, being several centimeters, and they are unable to measure small variations in position in a dynamic field.

On the basis of the state of the art, it can be further asserted that even the latest detector models have considerably lagged far behind the development of accelerators and of other measuring and analysis devices. The fact that known devices are out of date can also be seen in their quite simple user interfaces.

Yet a third device impinging on the state of the art is disclosed in U.S. Pat. No. 4,485,307. The device is intended for radioisotope diagnostics within an organ. In it, the XY-plane detectors set in a gas plenum are formed from two cathode layers. The cathode layer is formed of wires running in one direction and set at equal intervals to each other. The orientation of the wires of the layers is arranged such that the XY position of radiation can be determined on the basis of them. However, apparatus of this type has only a poor ability to determine in real time the shape of the radiation fields of modern high-energy radiotherapy devices creating dynamic fields. Further, radioisotope diagnostics have an operating environment that is, in terms of the energetics and intensity of the radiation field for instance, of a totally different order of magnitude to that of patient-care equipment, thus excluding the use of the apparatus disclosed in the publication in, for example, an accelerator environment.

SUMMARY OF THE INVENTION

The present invention is intended to create an entirely new type of apparatus suitable for monitoring the quality of patient-care equipment, which can be used to make measurements of both static and dynamic radiation fields easily and rapidly, and which eliminates the possibility of human error in dosimetric measurement. The invention also relates to a method for use in the apparatus, which permits the shape of a high-energy radiation field to be determined using the operating principle of an ionization chamber. The characteristic features of the method for determining the intensity distribution of a radiation field, in which the ionization caused by the radiation field is detected by means of parallel ionization detector planes arranged in an ionization chamber, two of which planes are formed of series of wires determining the position of the ionization event in the X and Y directions, which detector planes provide the X and Y co-ordinates $X_1$, $Y_1$ of the ionization event, is characterized in that the ionization event is created by means of the photonuclear reaction products arising from the radiation.

An apparatus for determining the intensity distribution of a radiation field, which apparatus includes at least two parallel ionization detector planes arranged in an ionization chamber, which are arranged to be formed of series of wires determining the position of an ionization event in the X and Y directions and that they are arranged to provide the X and Y co-ordinates $X_1$, $Y_1$ of the ionization event, is characterized in that, in addition, a photoreaction converter is fitted to the ionization chamber, in order to achieve indirect detection in the apparatus.

In the method according to the invention, photonuclear reactions arising from radiation are used to determine the shape of a radiation field. The apparatus includes a photonuclear reaction converter. According to one preferred embodiment, the direction of travel of the photonuclear reaction products is collimated. This improves the position precision of the apparatus. According to another preferred embodiment, the photonuclear reaction converter can be formed of layers of one or several substances, making it possible to change the energy area and the intensity sensitivity being investigated with the apparatus.

The apparatus according to the invention will, among other things, make the work of hospital personnel significantly more meaningful and motivated, because the measurement event itself will be considerably faster than when using presently known apparatuses.

Compared to the state of the art, by using the apparatus according to the invention a real-time image of the radiation field is created rapidly with a single measurement. This also permits the time dependencies of the dynamic fields achieved using present patient-care technology to be determined and allows the apparatus to be neutral to changes taking place in the environment. The measurement is thus considerably more reliable and its position precision is better than in the state of the art. In addition to this, the shape of the field can be changed in real time, by adjusting the accelerator and its parameters.

The apparatus according to the invention is unaffected by radiation damage and achieves the additional advantages of, among other things, a small shielding effect and easily arranged measurement of even extensive radiation fields. It is also characterized by the simplicity and cheapness of its electronics, in comparison to apparatuses based on the state of the art. The other characteristic features of the apparatus according to the invention will become apparent from the accompanying claims.

These and other features and advantages of the invention will be more fully understood from the following detailed description of the invention taken together with the accompanying drawings.

DETAILED DESCRIPTION OF THE INVENTION

Figure 1:
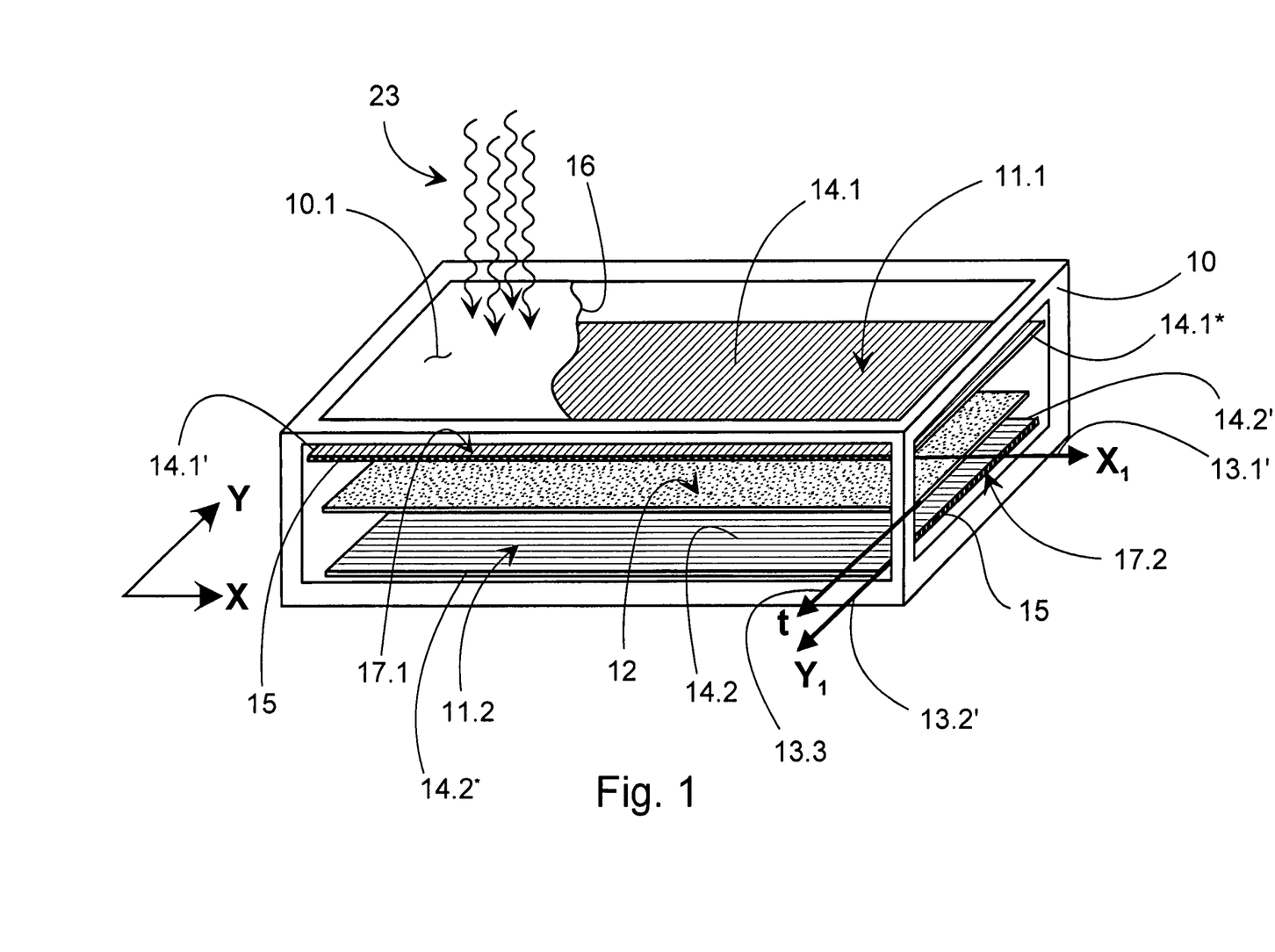
FIG. 1 shows a schematic diagram of one apparatus according to the invention.
Figure 2:
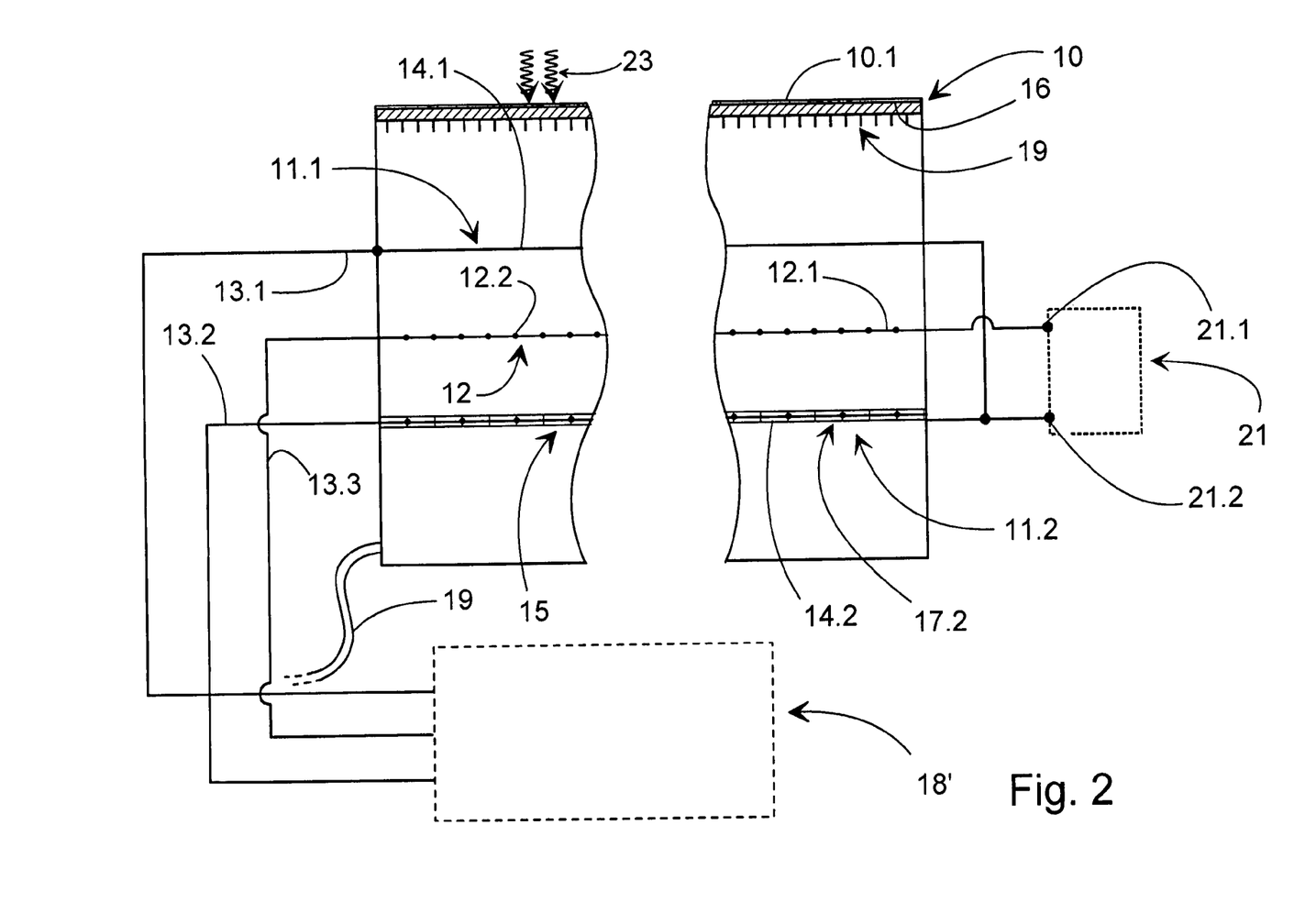
FIG. 2 shows a cut-off cross-section of the apparatus shown in FIG. 1.

FIGS. 1 and 2 show the simplified operating principle of one embodiment of the apparatus according to the invention. The case of the apparatus is formed by an ionization chamber 10, which is, for example, 30-cm long and 1-cm high. The ionization chamber 10 is filled with an ionizing gas, such as n-pentane, as a negative pressure. Inert gases, carbon hydrides, and generally compounds of them can be used as the filler gas of the chamber 10. The use of a negative pressure (for example, 1–6 Torr) results in the ionization chamber 10 having, in reality, slightly rounded sides.

In the embodiment shown in FIGS. 1 and 2, a mesh-like lo detector plane 12, which acts as a cathode plane rejecting electrons and attracting positive gas molecules and ions, and is formed from wires 12.1, 12.2, for example, of wolfram (wire diameter 100 µm), connected to the negative potential 21.1 of a power supply 21, is located in the ionization chamber 10. A signal wire 13.3 is connected to the cathode plane 12, for leading the current impulse t, which arises in the ionization chamber 10 due to the ionization caused by the radiation, to the measurement electronics 18.

Detector planes 11.1 and 11.2, which act as anodes and attract electrons, and are connected to the power source 21, are arranged relative to the cathode plane 12, for example, a short distance (e.g., 7–8 mm) above and beneath it and in parallel with the cathode plane 12. The potential 21.2 of the power supply 21 is of the opposite sign to that of the potential 21.1 connected to the cathode plane 12.

The anode planes 11.1, 11.2 are formed of parallel wires 14.1, 14.2 placed next to each other a constant distance apart, the material of which can be, for example, gold-plated wolfram, and the diameter of which is 20–40 µm. The anode planes 11.1, 11.2 are preferably arranged in the ionization chamber 10 in such a way that the wires 14.1 of anode plane 11.1 are oriented at right angles to the wires 14.2 of anode plane 11.2, so that detector plane 11.1 determines the X direction and detector plane 11.2 determines the Y direction. In the apparatus according to the example, the number of wires 14.1, 14.2 in each detector plane 11.1, 11.2 is 100, so that together they form 10000 intersection points. The distance between the wires can be, for example, 1–10 mm, preferably 2–7 mm.

The cathode plane 12 and the anode planes 11.1, 11.2 set on either side of it are arranged in the ionization chamber 10 to be parallel to the wall 10.1 of the ionization chamber 10 that essentially faces the incoming direction of the radiation field 23.

According to one preferred embodiment, the wires 14.1, 14.2 forming the anode planes 11.1, 11.2 are connected to each other at one end of the planes 11.1, 11.2 by delay elements 15, set at right angles to the wires 14.1, 14.2. The delay elements 15 form sequentially connected delay lines 17.1, 17.2 of the anode planes 11.1, 11.2. The delay elements 15 are characterized by the fact that the speed of travel of the charge in them is known.

The delay lines 17.1, 17.2 shown in FIGS. 1 and 2 depict them at a schematic level. In reality, the delay elements 15 and the delay lines 17.1, 17.2 formed by them are implemented by a series of adjacent wires 14.1, 14.2 forming wire series, for each one of which delay elements 15 are arranged by means of integrated semiconductor components (not shown), and the semiconductor components, set consecutively, forming functionally the delay lines 17.1, 17.2 shown in FIGS. 1 and 2.

According to one preferred embodiment shown in FIGS. 1 and 2, the first end of the delay lines 17.1, 17.2 is arranged to terminate at the wire 14.1', 14.2' nearest the edge of the anode plane 11.1, 11.2. Starting from the wire nearest the edge 14.1', 14.2', the delay elements 15 connect the ends of the wires 14.1, 14.2 of the anode plane 11.1, 11.2 to each other to the wires 14.1*, 14.2* of the opposite edge of the anode plane 11.1, 11.2, so that the current pulses $X_1$, $Y_1$ arising in the ionization 10 as a result of the radiation are led by the delay lines 17.1, 17.2 to the measurement electronics 18.

An embodiment is also possible, in which a separate line to the measurement electronics is arranged from each wire 14.1, 14.2, but this implementation will substantially complicate the apparatus.

Because the operation of the apparatus according to the invention is based on the observation of the ionization caused in a gas by the high-energy radiation emitted by a patient-care device, certain resolution problems are caused by the high energy and powerful intensity of the radiation, the background to which will next be examined in greater detail.

When using the accelerators (for example, the Linac accelerators) presently used in patient care, the typical radiation creates about $2*10^{15}$ pairs of ions each second in 1 kg of air. This corresponds to about $2*10^9$ pairs of ions arising in $cm^3$ of air in NTP conditions each second (density of air 1,293 $mg/cm^3$).

The amount of radiation travelling as far as the detector can be estimated, for example, by using the Klein-Nishina formula to calculate the angle distribution of the scattered photons at various levels of energy. It will then be observed that more than 90% of the photons at 10 MeV scatter at an angle of less than 10 degrees relative to their direction of arrival. Assuming that the scattering is on average, for example, in the order of two degrees, the energy released in the scattering of one photon is 120 keV. This corresponds to nearly 600000 photon interactions each second in 1 $cm^3$ of air in NTP (the same photon only interacts once).

The ionization chamber 10 according to the invention has an effective volume, in the case according to the example (about 2,5 liters), that is more than one thousand times that used in the above example of the calculation. This represents a frequency of more than 600 MHz, which exceeds the 1 MHz limit of which the measurement electronics 18 of the apparatus according to the example is capable.

The frequency can be reduced by lowering the intensity of the accelerator, by using a gas with poorer ionization, by reducing the pressure of the gas or the volume of the ionization chamber 10, etc. However, it is then possible that a sufficient ignition voltage will fail to be achieved by the radiation, so that the probability of the electrons colliding with each other will become too low and the electron avalanche phenomenon essential to the operation of the ionization chamber 10 will not be created.

In the apparatus according to the invention, this problem is solved by exploiting photonuclear reactions. In that case, the energetic photon emitted in the radiation performed by the patient-care device interacts with the heavy nucleus to create a nuclear reaction.

According to the method of the invention, in order to achieve a photonuclear reaction, a photonuclear reaction converter 16, in the form of, for example, a thin uranium or beryllium layer, is arranged on the inside of the wall 10.1, which faces the direction of the radiation field 23, of the ionization chamber 10 according to the invention and shown in FIGS. 1 and 2. The uranium is preferably used for a radiation of 15–20 MeV. When using uranium, the thickness of the photonuclear reaction converter 16 is 0,1–100 μm, preferably 3–15 μm, and depends on the surfacing material used. When using beryllium, the thickness may be even greater. It is known that the cross-section area of photonuclear reactions varies from a few tens of millibarns (1 mb=$10^{-3}$ b=$10^{-24}$ $cm^2$) to more than 300 millibarns, at typical accelerator energies. The photonuclear reaction recoils, heavy nuclei of uranium and alpha particles from beryllium, ionize the gas in the chamber 10 very powerfully. Besides the heavy nucleus, the uranium reaction creates one or more light particles, such as neutrons (so-called photoneutron reaction) or alternatively two medium-heavy nuclei (photo-fission).

A collimator 19 is installed in connection with the photonuclear reaction converter 16, to control the direction of travel of the photonuclear reaction products. By means of the collimator 19, the path of the reaction products created is made in one direction straight downwards towards the anode plane 11.1, 11.2, according to the set criteria of the characteristic parameters of the collimator 19. This prevents the distorting effect on the ionizing position data caused by laterally-directed reaction products in the ionization chamber 10.

The calculation frequency of the apparatus is now determined secondarily from the number of photonuclear reaction products, instead of primarily from the ionization caused by the radiation in the gas. This can be estimated, if the number of target atoms per $cm^2$ in the photonuclear reaction converter 16, the dependence of the cross-section area of a photoneutron reaction on the photon energy, and the photon flux per second are known.

The photon flux can be estimated using the law of absorption, in the utilization of which must also be estimated the photon flux passed straight through the gas without interacting with it and the original flux of the photons. In addition, the parameters required when estimating the photon flux include the total absorption coefficient ($cm^2/g$) of the gas (for instance, oxygen) in the ionization chamber 10, the surface density of the gas (=$1,293*10^{-3}$ $g/cm^2$), and the thickness of the gas layer (=1 cm).

It is known that, for example, when the absorption coefficient of oxygen gas $O_2$ is examined as a function of photon energy, the absorption typically takes place at the accelerator energies used in patient care almost entirely through Compton scattering (incoherent scattering) and only at energies approaching 20 MeV does pairing production begin be become a significant interaction mechanism.

According to the previous examination, 600 000 Compton scatterings take place each second in $cm^3$ (NTP), in other words, the difference between the original flux of the photons and the flux that has passed straight through the gas without interacting with it is $6*10^5$. By placing this estimated total absorption coefficient (~$2*10^2$) of the gas and the given surface density and surface layer thickness of the gas in the absorption law and solving it in relation to the original photon flux, the result obtained is $2,3*10^{10}$ $s^{-1}$. The result can be regarded as an estimate of the photon flux per second, in which case the number of reactions arising is obtained as about 10 000 reactions per second, for example, with a 1 $mg/cm^2$ (0,5 μm)-thick uranium membrane and a radiation of 10 MeV. (cross-section area ~200 mb), which is already clearly within the calculation capacity (1 MHz) of the apparatus according to the invention.

It should be noted that in the calculation example given, the aim is only to roughly estimate the order of magnitude of the number of reactions. In reality, the retardation radiation spectrum is continuous, and thus includes all the photon energies up to the maximum energy of the accelerator. The 10 MeV energy used in the estimation and the corresponding cross-section area are thus 'average values'.

By deposition, it is possible to manufacture very thin uranium layers, so that the number of reactions can, if necessary, be reduced almost arbitrarily. However, the thickness of the photonuclear reaction converter 16 cannot be increased arbitrarily, as it scatters and absorbs strongly the heavy reaction products that arise. However, the reaction products can be increased by increasing the number of holes in the collimator plate and/or by thinning the collimator, which, it is true, will result in a poorer position resolution ability. The total number of reaction products is also affected by the intensity of the accelerator (60–>600 R/min, R=Röntgen=258 μC/kg), the radiation time, and the energy (=cross section area).

When using a photonuclear reaction converter 16, the interactions, i.e. the number of arising of ionizing recoil particles is independent of the amount (pressure) of the gas in the case 10. A larger electron avalanche causing a charging impulse will be produced much more readily by a heavy particle than by an electron scattered due to an interaction in the gas. Exploiting this allows the pressure and ignition voltage to be optimized, to minimize the interference background caused by the Compton electrons arising in the gas and to attempt to emphasize the pulses produced by the recoil ions.

Figure 3:
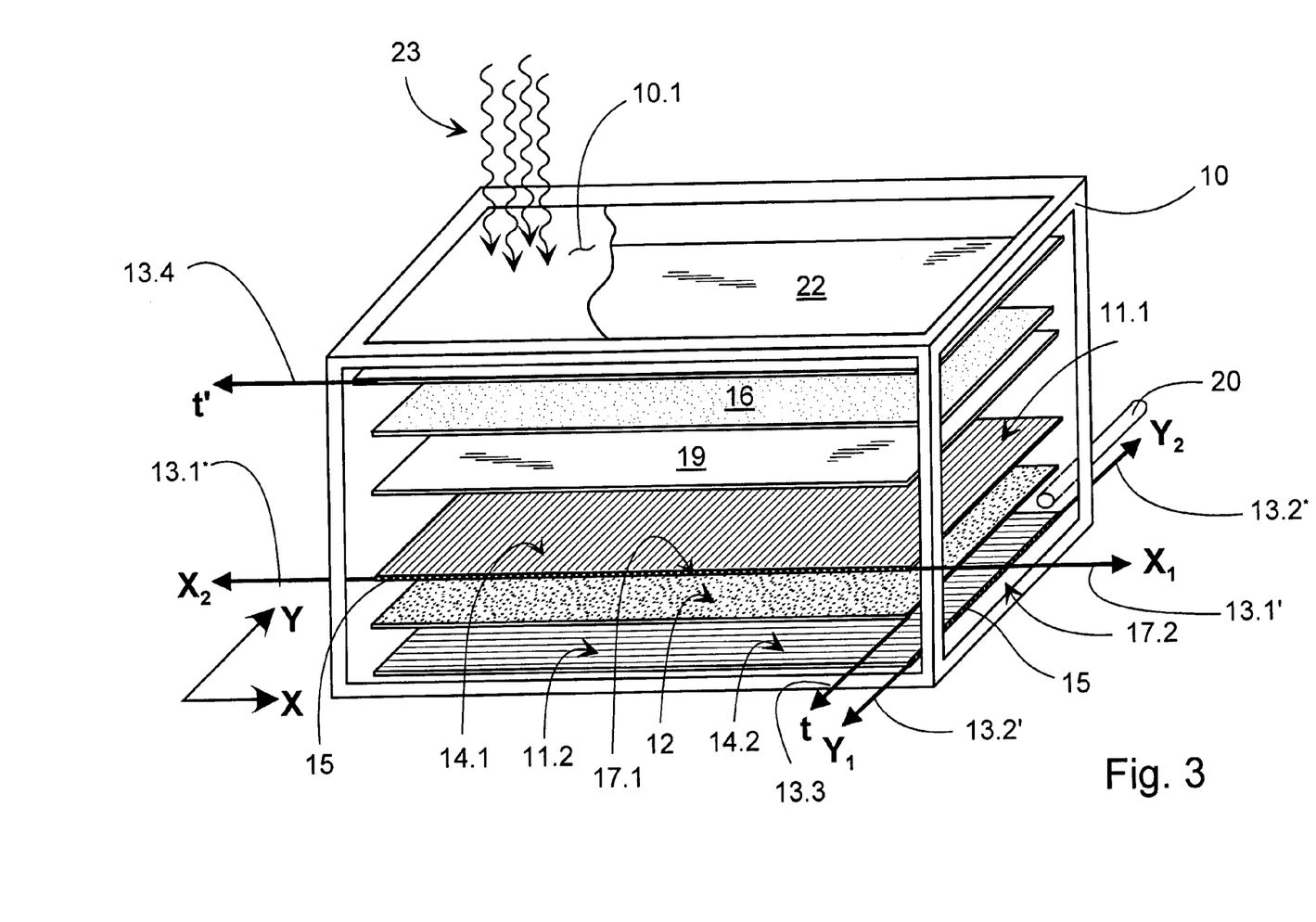
FIG. 3 shows a schematic diagram of an improved apparatus according to the invention.

In the improved embodiment of the apparatus according to the invention, shown in FIG. 3, in the ionization chamber 10 are arranged two ionization detector planes 11.1, 11.2 acting as anodes are shown in connection with the embodiment shown in FIGS. 1 and 2, while a third detector plane 12 acting as a cathode is located between them. Further, the photonuclear reaction converter 16 and the collimator 19 are arranged separately from the wall 10.1 that is a right angles to the direction of the radiation.

Between the wall 10.1 and the photonuclear reaction converter 16, an additional cathode plane 22 is arranged, corresponding functionally to the said third detector plane 12, in connection with which means 13.4 are arranged for conducting the current pulse t' to the measurement electronics. The use of the additional cathode plane 22 minimizes, among other things, the interference background caused by the Compton electrons coming directly from the patient-care device, being scattered by the environment, and arising in the wall 10.1. This is carried out with the aid of the measurement electronics by compensating the signals t, t'.

In addition, the delay lines 17.1, 17.2 of the anode planes are connected at both ends to conduct the current pulses $X_1$, $X_2$, $Y_1$, $Y_2$ arising from the photonuclear reactions to the measurement electronics 18. This improves the shape of the signals and the resolution ability of the XY position data of the ionization event. FIG. 3 also shows the gas feed connection 20 arranged to the ionization chamber 10.

Figure 4:
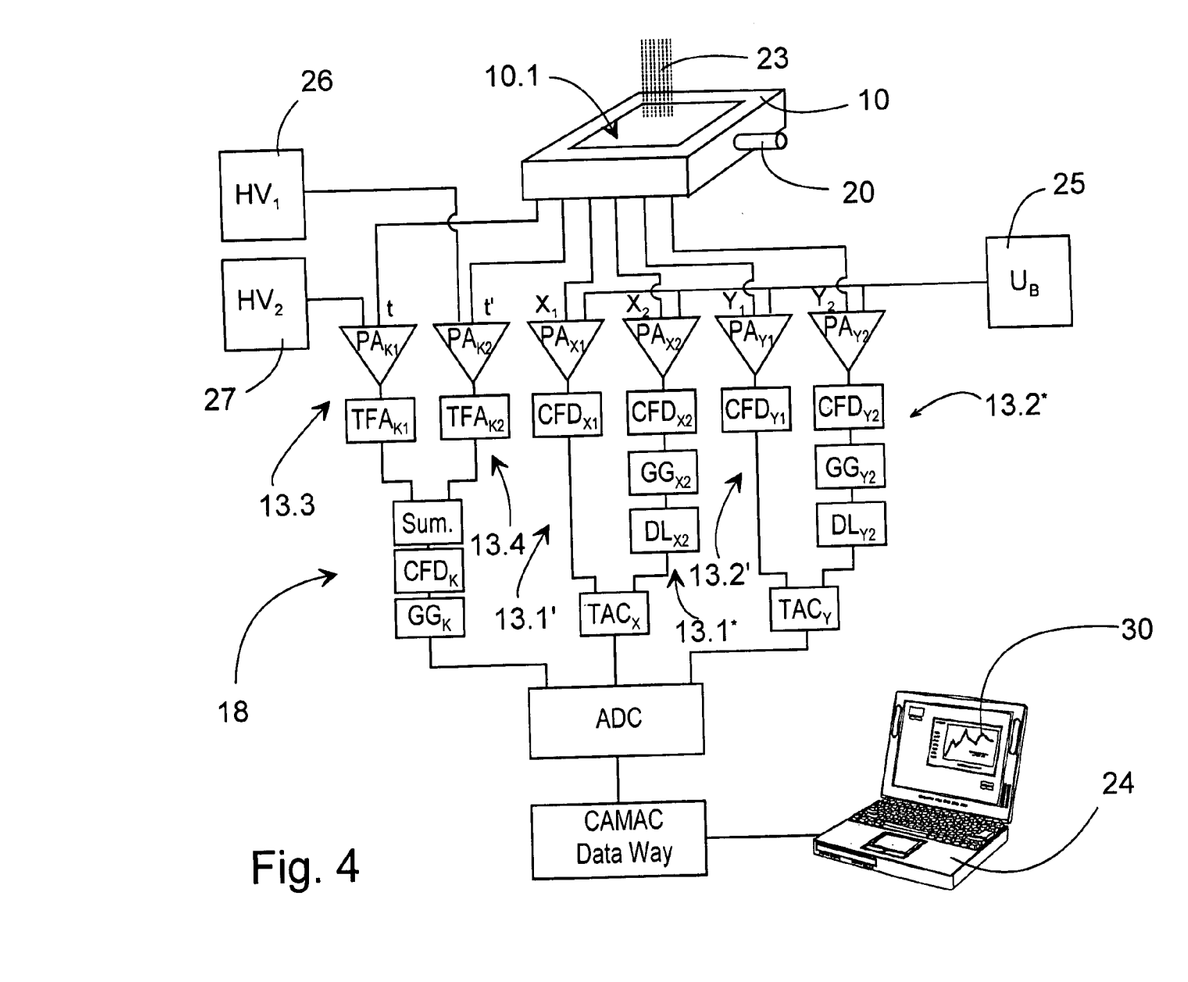
FIG. 4 shows schematic diagram of the electronics of the improved apparatus according to the invention shown in FIG. 3.

FIG. 4 shows an example of one preferred alternative for the implementation of the measurement electronics, in the case of the embodiment shown in FIG. 3. The measurement electronics 18 comprises functioning circuit components that are known as such in electronics at a component level.

The signal lines 13.3, 13.4 of the cathode planes 12, 22 include, itemized starting from the cathodes 12, 22, preamplifiers $PA_{K1}$, $PA_{K2}$ (e.g., KERT AT53S), which are followed by timing filter amplifiers $TFA_{K1}$, $TFA_{K2}$ (e.g., GSI DTFA 83). In the second preamplifier, the polarity of the signal is converted to the opposite sign. These components, which are thus located one on the signal lines 13.1, 13.4 of the cathodes 12, 22, are followed by a common summing circuit SUM for the lines 13.3, 13.4, by means of which the current impulses t, t' brought from both cathodes are added together. Being of opposite signs, they thus compensate each other.

Because the high-energy Compton electrons only interact slightly in the photoelectron converter, the signals t, t' that they cause compensate and only the signals t, which are caused by the reaction products, pass through the SUM summing circuit. These are led to a constant fraction discriminator $CFD_K$ (e.g., ORTEC CF 8000) and from there to a delay-gate generator $CG_K$. After this, the cathode signal is led to an analog to digital converter ADC (e.g., ORTEC 413A).

In order to lead the current pulses $X_1$, $X_2$, $Y_1$, $Y_2$ of the anode planes 11.1, 11.2 to the measurement electronics 18, delay lines dedicated separate lines 13.1', 13.1*, 13.2', 13.2* are arranged for the outputs at both ends of the delay lines 17.1, 17.2. In the lines 13.1', 13.1*, the anode 11.1 is followed by preamplifiers $PA_{AX1}$, $PA_{AX2}$, from which the pulses $X_1$, $X_2$ are taken through constant fraction discriminators $CFD_{AX1}$, $CFD_{AX2}$ in a second line, for example, 13.1', directly to the time to amplitude converter $TAC_X$ (e.g., ORTEC 467).

In the second line 13.1*, before the $TAC_X$ there is a delay gate generator $GG_{X2}$ and a delay element $DL_{X2}$ (e.g., GAEN 107, GAEN 108). This ensures that the signal $X_2$ is always delayed in relation to the signal $X_1$ and that the pulse formed in the $TAC_X$, which is proportional to their time difference, is positive. From the $TAC_X$, the signal is led to the analog to digital converter ADC, as in the case of the cathode lines 13.3, 13.4 described above.

The anode 11.2 that defines the ionization event in the Y direction has also a signal line arrangement that is functionally essentially similar, and has signal lines 13.2', 13.2* starting from both ends of its delay line 17.2, in order to lead the current pulses $Y_1$, $Y_2$ to the measurement electronics 18.

By means of the $TAC_X$ and $TAC_Y$, the time differences of the current impulses $X_1$, $X_2$, and $Y_1$, $Y_2$ are converted into amplitudes, the AD conversion of which can be interpreted as corresponding X, Y position data. By taking the current pulses from both ends of the delay lines 17.1, 17.2, and deducting their values from each other, substantially more accurate XY position data is obtained than in the embodiment shown in FIG. 1, the measurement electronics 18' of which otherwise corresponds to that shown in FIG. 4, except that it lacks the signal line 13.4 corresponding to the additional cathode 22 and the summing circuit SUM, as well as the signal lines 13.1*, 13.2*, equipped with, among other things, the delay elements $DL_{X2}$, $DL_{Y2}$, of the X and Y anode planes 11.1, 11.2. Operationally, this kind of implementation of the measurement electronics 18' is functional, but by using the assembly shown in FIG. 4 it is possible to achieve a considerably more accurate result in defining the iXY position data of the ionization events of the photonuclear reactions caused by the radiation field 23. An even better result than this can be achieve by applying the summing circuit technique to the anode signals too.

The current pulses t, t' from the cathodes 12, 22, converted by the measurement electronics 18 and the current pulses of the anodes 11.1, 11.2 are taken, for example, to a PC computer 24, in connection with which special software is arranged for calculating the XY position data of the radiation field 23 as input from the given signals and in order to present the shape of the radiation field 23.

Separate power supplies 26, 27 (typically 400–600 V) are arranged for the cathode lines 13.3, 13.4 of the measurement electronics 18 and a common bias power supply 25 is arranged for the anode lines 13.1', 13.1*, 13.2', 13.2*. FIG. 4 does not show the actual power supplies of the anodes 11.1, 11.2 and the cathodes 12, 22.

Figure 5:
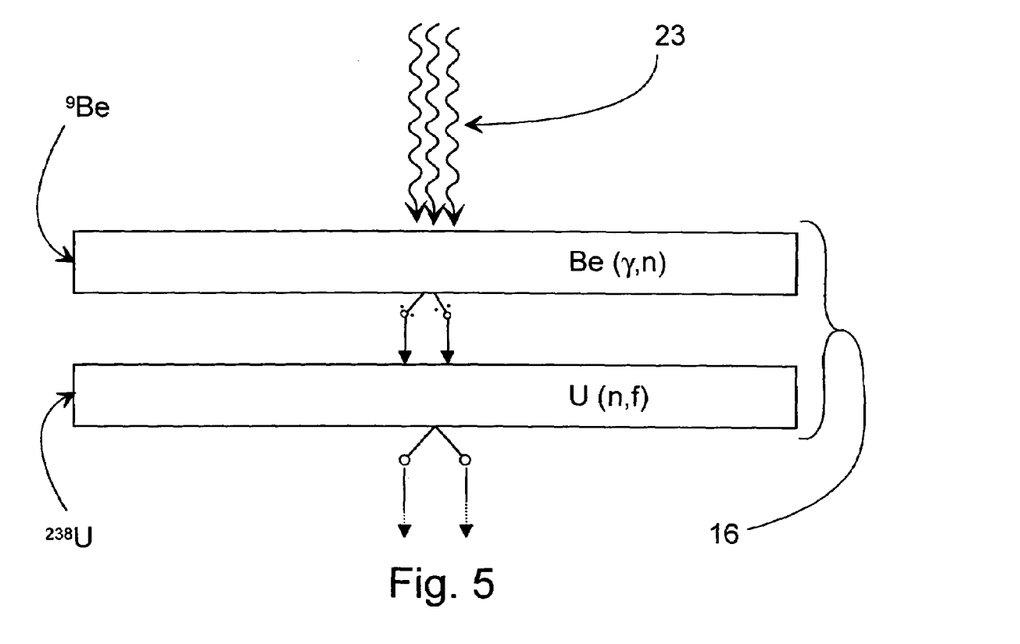
FIG. 5 shows a schematic diagram of a second embodiment of the photonuclear reaction converter.

FIG. 5 shows on a schematic level yet another embodiment of the implementation of the photonuclear reaction converter 16. Because at low gamma energies (less than 9 MeV) a converter 16 made purely from uranium 238 will create practically no photonuclear reactions that are essential from the point of view of the invention, the reaction converter 16 can be arranged to comprise several layers on top of each other. In this embodiment, the wall 10.1 of the ionization chamber 10 facing the arrival direction of the radiation field 23 is followed first of all by a beryllium layer Be-9, in which reactions arise already at energies of less than 2 MeV (threshold energy 1,67 MeV). The Be-9 layer is followed by a uranium layer U-238. In FIG. 5, the layers are shown as being separate from each other, to better depict the reaction products created. In reality, the layers thus lie against each other.

The radiation 23 first causes a Be-9 gamma ->neutron Be(y, n) reaction in the beryllium layer, in which two alpha particles are released in addition to neutrons. The neutrons released in the reaction next strike the uranium layer U-238, causing a neutron ->fission U(n,f) reaction in it. In this case, the released heavy fission products strongly ionize the gas, which is measured in the same way as has already been described in the gamma ->fission U(y, f) reaction that takes place at higher energies.

Figure 6:
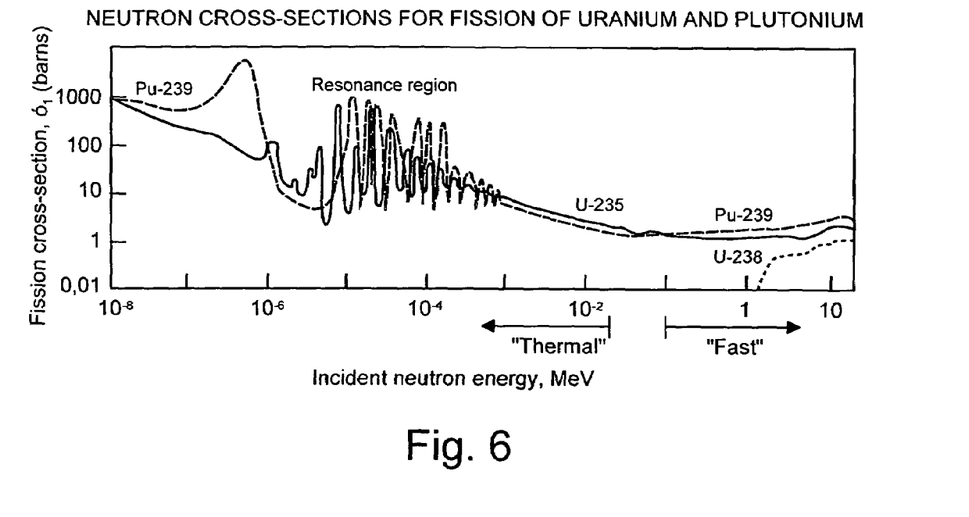
FIG. 6 shows neutron interaction areas in some possible photonuclear reaction-converter materials.

FIG. 6 shows the neutron cross-section areas in uranium U-235, U-238, and plutonium Pu-239. It can be seen from the figure, that at less than 2 MeV the neutrons no longer create reactions in U-238, the material of the converter having to be replaced by U-235 (Pu-239). The use of other isotopes of uranium and plutonium is naturally also possible.

Next, the operation of the apparatus according to the invention is described. A photon (gamma beam) emitted by the patient-care device (not shown) creates a photonuclear reaction in the uranium or beryllium layer 16 of the ionization chamber 10, the heavy nuclei or alpha particles that arise in connection with which ionize the gas in the chamber 10 very strongly. In the reaction, in addition to heavy nuclei or alpha particles, either one or more light particles, typically neutrons arise, so that it is a question of a so-called photoneutron reaction, or alternatively of two medium-heavy nuclei, in which case the question is of so-called photofission. When the gas is ionized, an electron is detached from it, which, when it travels through the ionization chamber 10, collides with the electrons of other gas atoms and thus creates an electron avalanche, which is sufficiently large to create a current pulse measurable using the detector devices 12, 22, 11.1, 11.2.

There is a difference in potential between the cathodes 12, 22 and the anodes 11.1, 11.2 of the ionization chamber 10, so that the electron avalanche created travels to the anodes 11.1, 11.2 in the positive potential. The electron avalanche causes a current pulse detectable with the measurement electronics 18, in those wires 14.1, 14.2 that are located mainly close to the point hit by the gamma beam in the converter 16. As a result of the ionization, the gas molecules and ions create a current pulse t in the cathode 12, which is used to set the start of the time window for the measurement electronics 18. The current pulses t can be differentiated, as the pulses that take place simultaneously with the current pulses registered by the additional cathode 22 are left out of consideration. After the initial point t, the corresponding points in time, by means of which the XY position data of an ionization event can be determined, are determined using the measurement electronics 18 for the current pulses $X_1$, $X_2$, $Y_1$, $Y_2$, corresponding to the XY position of the ionization, arriving at the measurement electronics 18 from the anode planes 11.1, 11.2.

In reality, the electron avalanche that travels to the anodes 11.1, 11.2 may cause a current pulse in several adjacent anode wires 14.1, 14.2. However, this has no significant effect on the measurement accuracy of the apparatus, as the signals of the wires adjacent to the wire corresponding to the real hit point are sufficiently weak for the position data to be essentially ascertained to an accuracy of a single wire.

The current pulse is collected by the anodes 11.1, 11.2 to the delay lines 17.1, 17.2, in which the speed of travel of the charge, i.e. the delay time of the delay elements 15 forming the delay lines 17.1, 17.2, is known. Compared to this, the delays of the individual anode wires 14.1, 14.2 are so small that they have no relevant significance. If, for example, in the case of the apparatus shown in FIGS. 1 and 2, it takes 100 ns for the charge to travel from one end of a delay line 17.1, 17.2 to the other, and if it takes 70 ns for the charge to travel from the hit point on the delay line 17.2 defining the X direction and 30 ns to travel from-the hit point on the delay line 17.1 defining the Y direction, the hit position can be determined using the measurement electronics 18 in the defined set of XY co-ordinates. In this case, it is the point ($T_X$=70, $T_Y$=30). By collecting a group of points ($T_X$, $T_Y$), it is possible to determine the intensity distribution in the surface of the ionization chamber 10.

In the embodiment shown in FIG. 3, the times corresponding to the current pulses $X_1$, $X_2$, $Y_1$, $Y_2$ obtained from both ends of the delay lines 17.1, 17.2 are deducted from each other $X_2$-$X_1$, $Y_2$-$Y_1$, giving a sharper signal, on the basis of which substantially more precise XY position data is obtained. The time difference of the current pulses is proportional to the position data of the ionization event.

Due to the short measurement time achieved using the apparatus according to the invention, changes in the ambient temperature taking place during the measurement event and the changes in the pressure of the gas in the ionization chamber 10 caused by them need not be taken into account. In addition, the XY positioning accuracy of the measurement points is excellent, as is it determined only by the mutual distance between the wires 14.1, 14.2 forming the anode planes 11.1, 11.2.

An accurate gas feed, pressure regulation, and monitoring system (not shown) can also be fitted to the apparatus according to the invention, which will also permit pressure tests to be made. The gas pressure in the apparatus is optimized according to the heavy ions, so that neither too many nor too few excitations take place. The measurement electronics 18 can be adapted to allow pulse height and threshold voltage to be exploited.

The apparatus includes the necessary connections for the measurement electronics 18, gas-, feed, and data processing, as well as a control and operating system. The systems include accurate software-based, automatic control possibilities for monitoring the ignition voltage and the gas pressure. The apparatus includes not only the measurement electronics 18, but also an user interface 30 for controlling them and for processing the measurement data. The user interface 30 can be easily connected to an automatic data system serving quality control and to the accelerator (not shown).

Neutrons too are produced in the photonuclear reactions. In practice, there are, however, very few of them. The walls of the ionization chamber 10 can be constructed from a material that slows down neutrons, for example, by lining them with paraffin wax or boron. In addition, when the accelerator is operating, no-one is allowed to be in the measuring room anyway, so that the exploitation of the photonuclear reactions is detrimental to neither the apparatus operators nor to the environment. Inside the ionization chamber 10, the thermic neutrons can produce long-term activity only in the thinly-shaped photonuclear reaction converter 16 and the anode wires 14.1, 14.2, but due to the small amount of heavy materials this is not significant. However, there is reason to monitor the possible accumulation of activity.

One important advantage achieved by the invention is the elimination of possible human errors in dosimetric measurements. This is achieved by the user-friendly and easy-to-use operating system 30 and by integrating the accelerator too in the measurement. In addition, the measurement process becomes simpler and more rational, as the apparatus according to the invention eliminates unnecessary manual work stages.

The following is a collection of the more important measurements relating to radiotherapy quality control, which can be advantageously performed using the apparatus according to the invention.

Isodose measurements, in which the dose distribution in water at standard depths of a radiation field is measured using predefined field-size values, according to a specific measurement protocol. The measurement results can be used to configure a dose-planning program and for quality control.

The definition of field-size coefficients and wedge coefficients, which is carried out for predefined rectangular fields. In this case, the dose maximum on the centre axis of the radiation is defined and the dose produced by a specific monitor-unit amount (MU) at the location in question is measured. The results are standardized against the dose of a standard field (10 cm×10 cm). The wedge coefficients are defined in relation to the doses of an open field and a corresponding wedge field.

Dose calibration, in which the correspondence between dose produced by the care device and the monitor-unit setting of the device is determined. The dose is defined in a dose maximum for each type of energy and radiation, in the centre axis of a field with a size of 10 cm×10 cm. The accuracy of the dose calibration is extremely important, because it forms the basis of all the care doses.

In determining the dose linearity of the linearity of a dose during the radiation of a predefined monitor-unit amount.

Determining dose repeatability, in which radiation of a specific monitor-unit amount is repeated several times and the repeatability of the dose is determined.

The dependency of the dose on various angles of tilt, because the radiation produced by a radiotherapy accelerator depends to some extent on the angle of tilt of the accelerator. The variation is cause by the mechanism of the accelerator and to some extent by gravity.

Due to the tolerances in the moving parts of the accelerator and other mechanical constructions variations in the dose also appear as a function of the rotation of the collimator. The dose variation is measured using a predefined collimator angles at all energies.

It must be understood that the above description and the related figures are only intended to illustrate the present invention. The essential element in the method and apparatus according to the invention is the use of photonuclear reactions. On the basis of the description, there are indeed several alternatives for the measurement electronics and the manner of determining the XY position data of the ionization event. Thus, the invention is not restricted only to the embodiments presented above or defined in the claims, but instead many different variations and adaptations that are possible within the scope of the inventive idea defined by the accompanying Claims will be obvious to one versed in the art.

References:
[1] OECD/NEA 1989, Plutonium fuel—an assessment. Taube 1974, Plutonium—a general survey.

The invention claimed is:

1. A method for determining the intensity distribution of a radiation field, in which the ionization caused by the radiation field is detected by means of parallel ionization detector planes arranged in an ionization chamber, two of which planes are formed of series of wires determining the position of the ionization event in the X and Y directions, which detector planes provide the X and Y co-ordinates $X_1$, $Y_1$ of the ionization event, characterized in that the ionization event is created by means of the photonuclear reaction products arising from the radiation.

2. A method according to claim 1, characterized in that the direction of travel of the photonuclear reaction products is collimated to be at essentially right-angles to the detector planes.

3. A method according to claim 1, characterized in that the said photonuclear reaction products are created through one or several intermediary product stages.

4. An apparatus for determining the intensity distribution of a radiation field, which apparatus includes at least two parallel ionization detector planes arranged in an ionization chamber, which are arranged to be formed of series of wires determining the position of an ionization event in the X and Y directions and that they are arranged to provide the X and Y co-ordinates $X_1$, $Y_1$ of the ionization event, characterized in that, in addition, a photonuclear reaction converter is fitted to the ionization chamber, in order to achieve indirect detection in the apparatus.

5. An apparatus according to claim 4, characterized in that the said photonuclear reaction converter is arranged to include one or more layers.

6. An apparatus according to claim 4, characterized in that the thickness of the said photonuclear reaction converter is 0.1–100 μm.

7. An apparatus according to claim 4, characterized in that the said photonuclear reaction converter is arranged in the ionization chamber in connection with the wall arranged facing the direction of the radiation field.

8. An apparatus according to claim 4, characterized in that collimator devices for controlling the direction of travel of the photonuclear reaction products are arranged in connection with the apparatus.

9. An apparatus according to claim 4, characterized in that the apparatus includes a third detector plane for determining the time window of each measurement and that the said two detector planes are arranged to act as anodes and the said third detector plane as a cathode.

10. An apparatus according to claim 4, characterized in that the series of wires of the said two detector planes are arranged to be connected at least at one end to the measurement electronics.

11. An apparatus according to claim 10, characterized in that the series of wires of the said two detector planes are at one end arranged to be connected by delay elements, so that the said delay elements connected consecutively are arranged to create a delay line, by means of which the current pulse generated by the ionization event is arranged to be led to the measurement electronics from at least one end of the delay lines.

12. An apparatus according to claim 11, characterized in that a current pulse generated by the radiation field is arranged to be led from both ends of the delay lines to the measurement electronics, in which delay means ($DL_{X2}$, $DL_{Y2}$) are arranged for the current pulses led from one end of the delay lines, in order to improve the position resolution of the apparatus.

13. An apparatus according to claim 4, characterized in that the said two detector planes are arranged to be formed of series of wires, the distance between wires within the detector planes is arranged to be 1–10 mm.

14. An apparatus according to claim 9, characterized in that, in addition to the said detector planes, a plane corresponding functionally to the said third detector plane is arranged in the ionization chamber, in order to improve the resolution capability of the apparatus.

15. An apparatus according to claim 4, characterized in that the ionizing gas arranged in the ionization chamber is one of an inert gas, carbon hydride, a compound based on an inert gas, and a compound based on carbon hydride.

16. An apparatus according to claim 5, characterized in that the layers of the said photonuclear reaction converter are uranium.

17. An apparatus according to claim 5, characterized in that the layers of the said photonuclear reaction converter are beryllium.

18. An apparatus according to claim 5, characterized in that the layers of the said photonuclear reaction converter are uranium and beryllium.

* * * * *